United States Patent

Flower et al.

Patent Number: 5,944,297
Date of Patent: Aug. 31, 1999

[54] ISOLATING MOUNT WITH PRELOADED ELASTOMERIC COMPONENTS

[75] Inventors: Wallace C. Flower; Paul J. Balczun; Thomas A. David; Holly M. Carlson; Ulrich A. Kuester, all of Erie, Pa.

[73] Assignee: Lord Corporation, Cary, N.C.

[21] Appl. No.: 08/886,854

[22] Filed: Jul. 1, 1997

[51] Int. Cl.$^6$ .................................................. F16M 13/00
[52] U.S. Cl. ............................................ 248/638; 248/632
[58] Field of Search ................................... 248/638, 634, 248/632, 647, 560, 562; 267/141, 136, 153

[56] References Cited

U.S. PATENT DOCUMENTS

| | | | |
|---|---|---|---|
| 2,322,844 | 6/1943 | Goldschmidt | 248/358 |
| 2,858,127 | 10/1958 | Moulton | 267/63 |
| 2,891,744 | 6/1959 | Hirst et al. | 248/9 |
| 3,242,877 | 3/1966 | Hirst et al. | 105/136 |
| 4,183,496 | 1/1980 | Brock et al. | 248/638 |
| 4,504,036 | 3/1985 | Passarell et al. | 248/632 |
| 4,660,797 | 4/1987 | Tönnies | 248/610 |
| 4,733,854 | 3/1988 | Miyamoto | 267/140.1 |
| 4,871,152 | 10/1989 | Funahashi | 267/140.1 |
| 4,958,811 | 9/1990 | Brenner et al. | 267/140.1 |
| 4,958,812 | 9/1990 | Wolf et al. | 267/294 |
| 5,024,425 | 6/1991 | Schwerdt | 267/140.1 |
| 5,042,785 | 8/1991 | LeFol et al. | 267/140.1 |
| 5,052,500 | 10/1991 | Ohtsu | 173/162.002 |
| 5,116,030 | 5/1992 | Nowak et al. | 267/140.4 |
| 5,123,634 | 6/1992 | Schwerdt | 267/140.1 C |
| 5,449,152 | 9/1995 | Byrnes et al. | 267/153 |

OTHER PUBLICATIONS

A. B. Davey and A. R. Payne, Rubber in Engineering Practice, 1964, pp. 378–379.

Primary Examiner—Ramon O. Ramirez
Assistant Examiner—Long Dinh Phan
Attorney, Agent, or Firm—Randall S. Wayland; Richard K. Thomson

[57] ABSTRACT

A mount for isolating a vibrating member from its support. An elastomeric element is made up of four components that are preferably bonded to the inclined outer surface of an inner member and the inclined inner surface of an outer member. One of the inner and outer members is bifurcated and drawing the two halves into mating engagement results in the elastomeric components being preloaded simultaneously in compression and shear. The elastomeric element is preferably formed with portions which snub movement in each of three orthogonal directions. The dimensions of the pair of elastomeric components above or below the vibrating member may be different than the other pair since the greater compression strain on one pair of components will make its stiffness characteristics more critical to determining the effective stiffness of the mount.

24 Claims, 14 Drawing Sheets

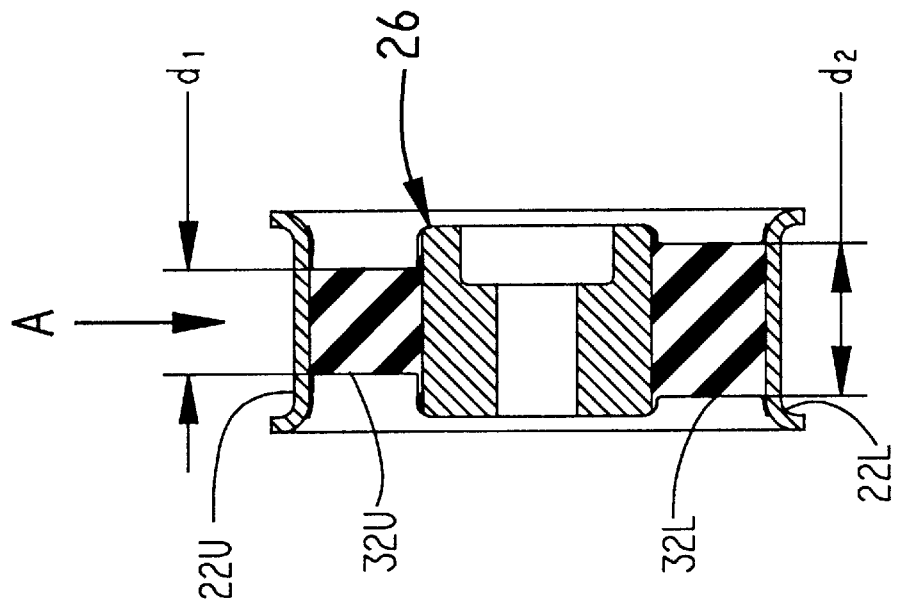
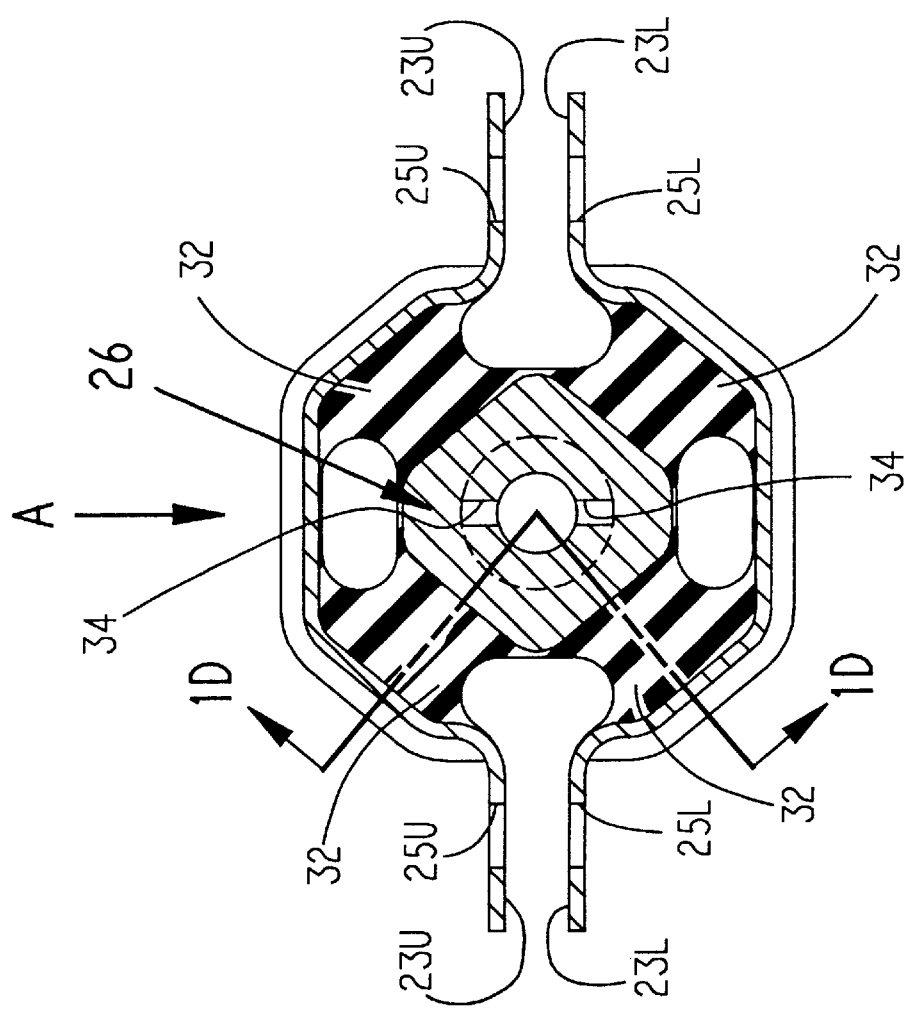
Fig. 1D
Fig. 1C

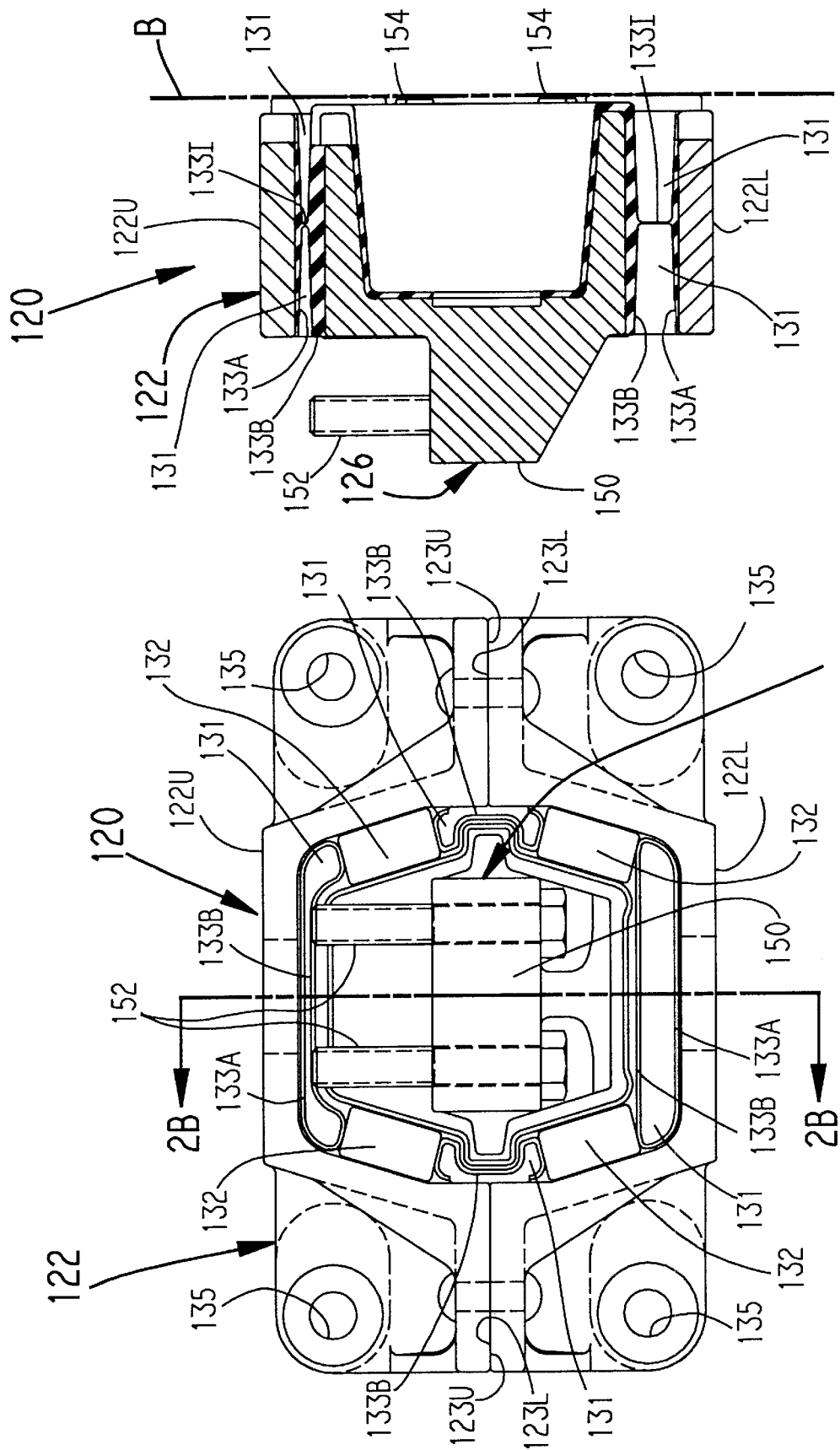

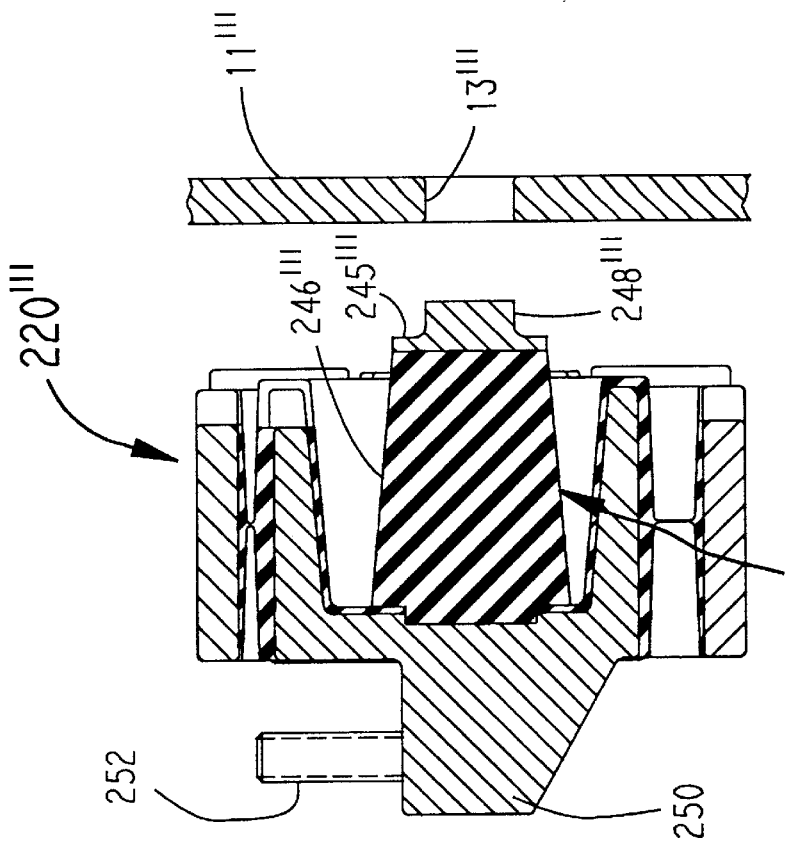
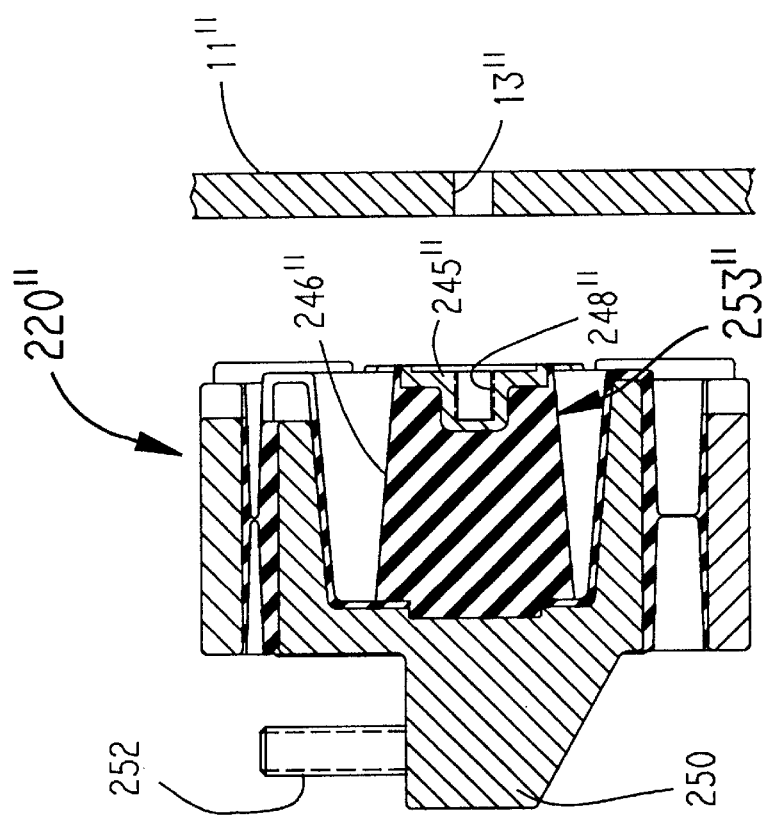
Fig. 3H
Fig. 3G

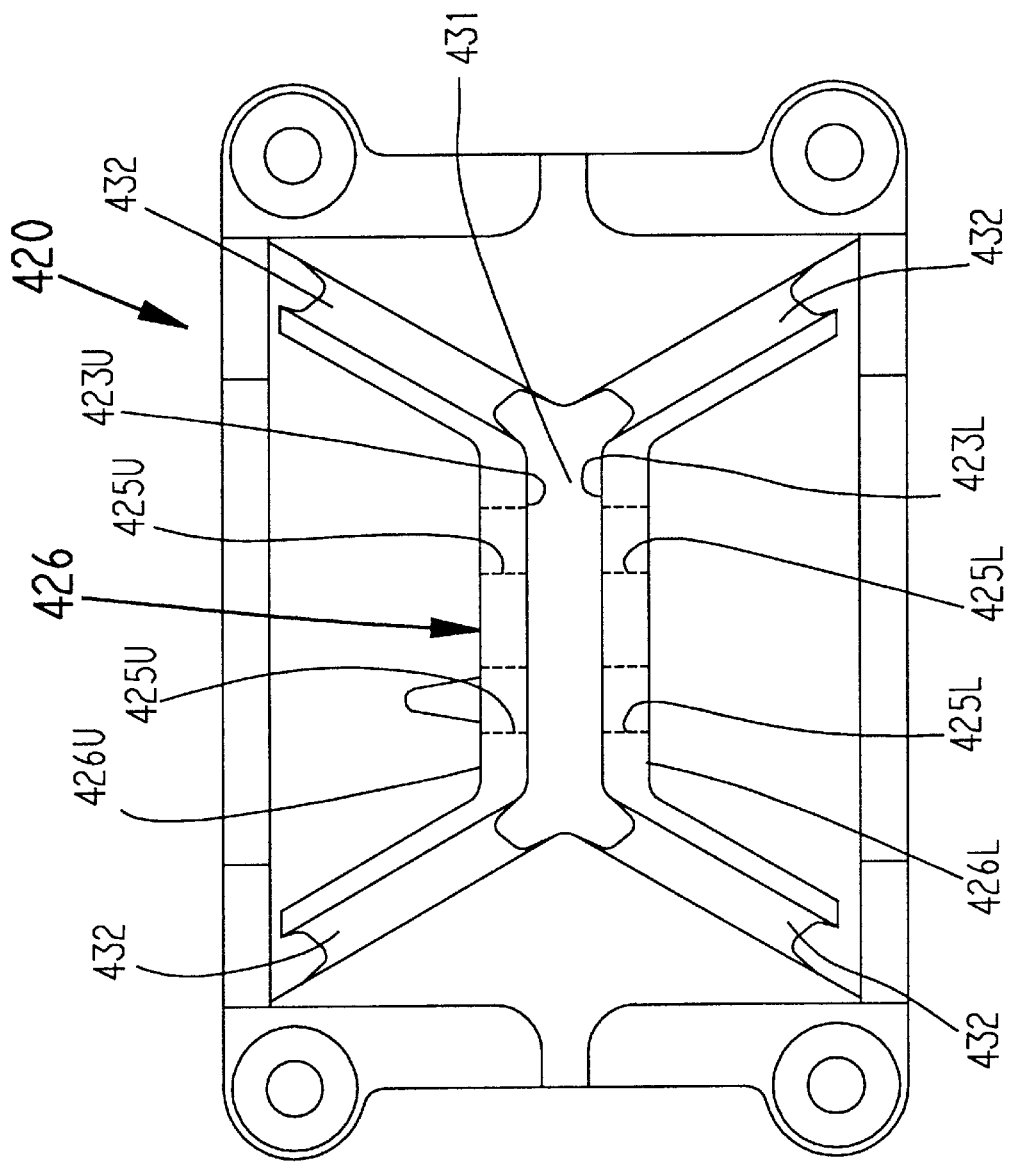

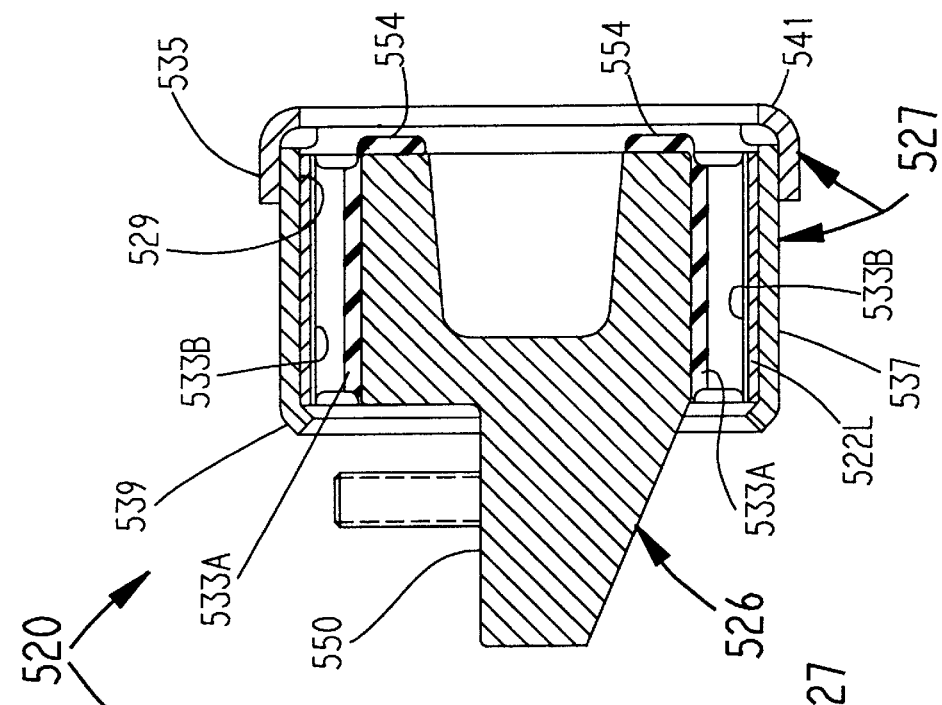
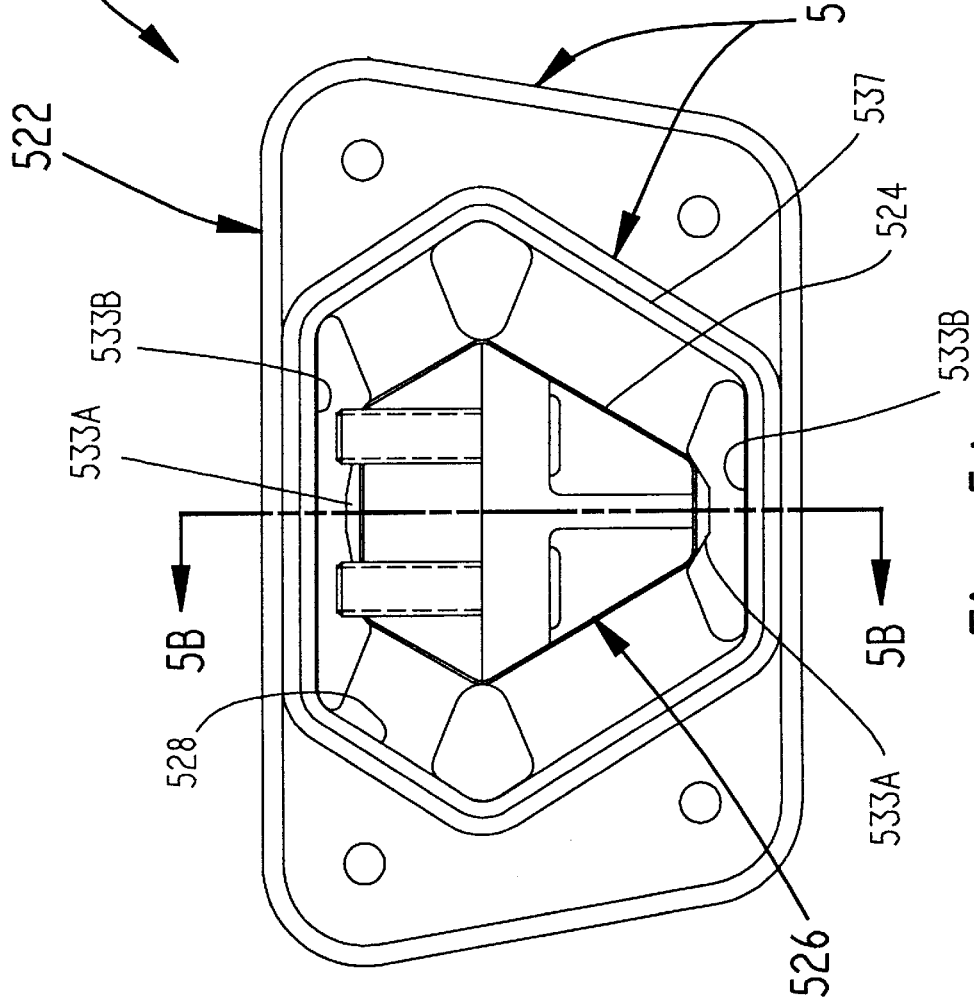

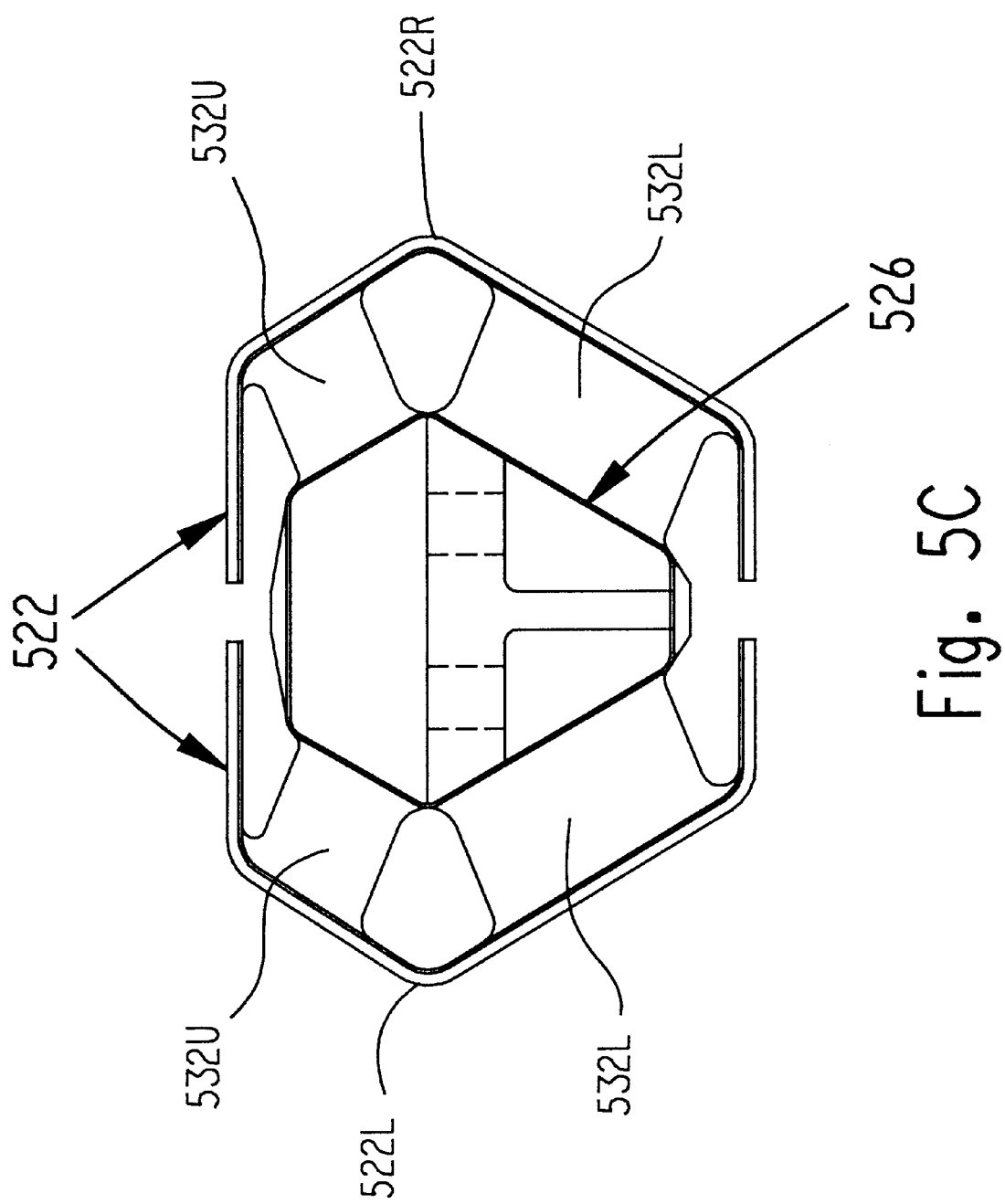

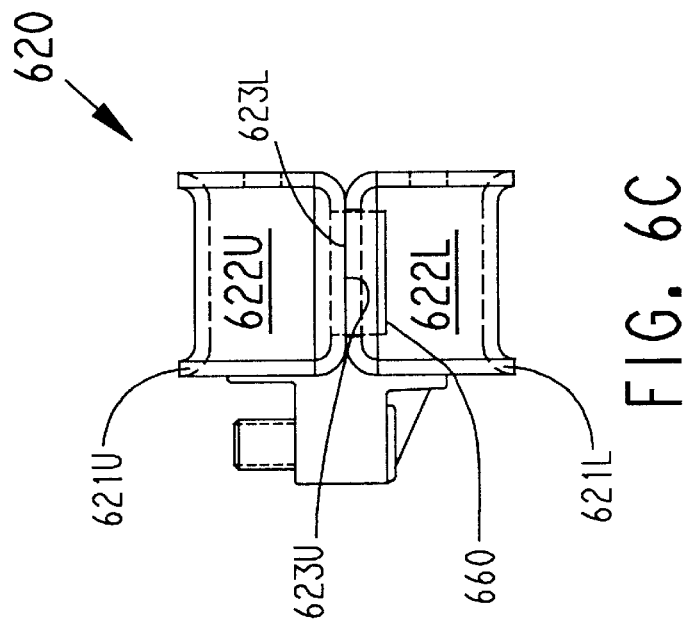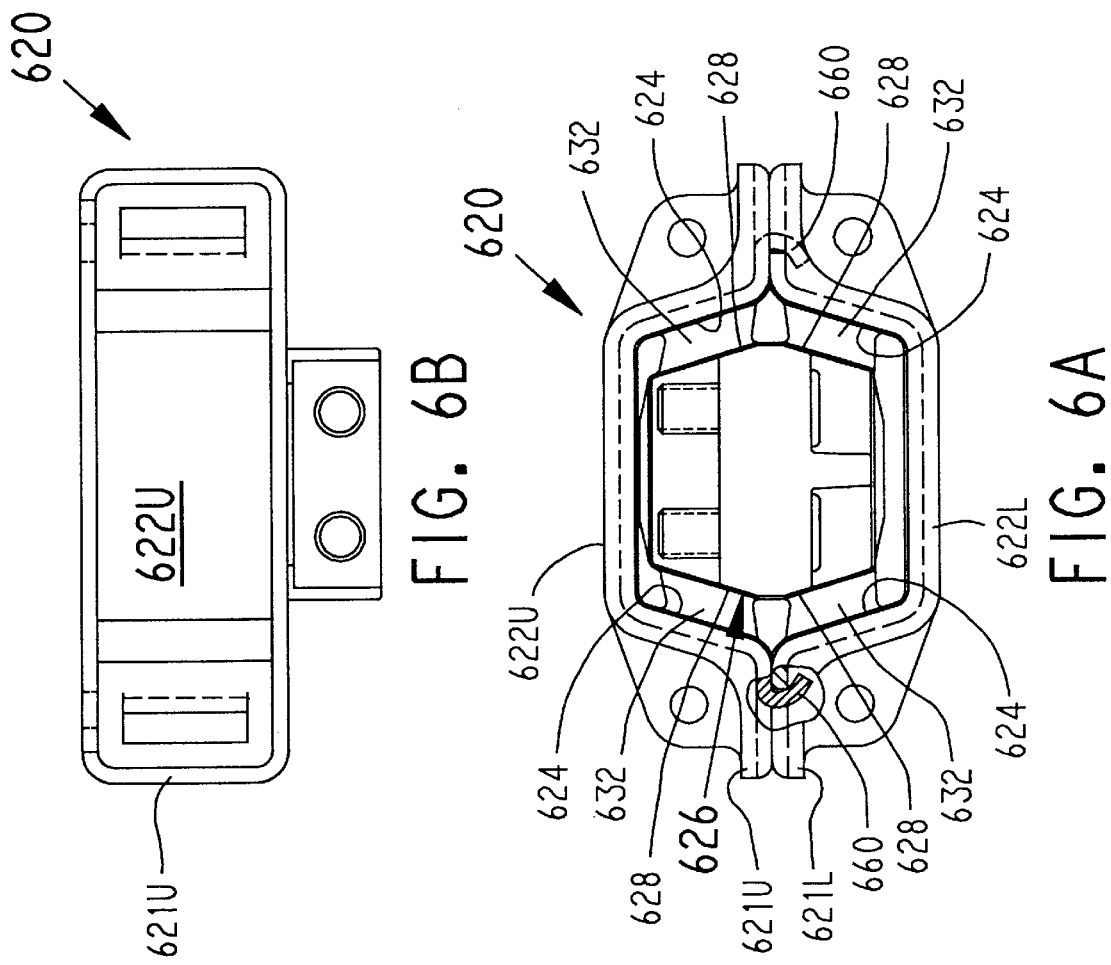

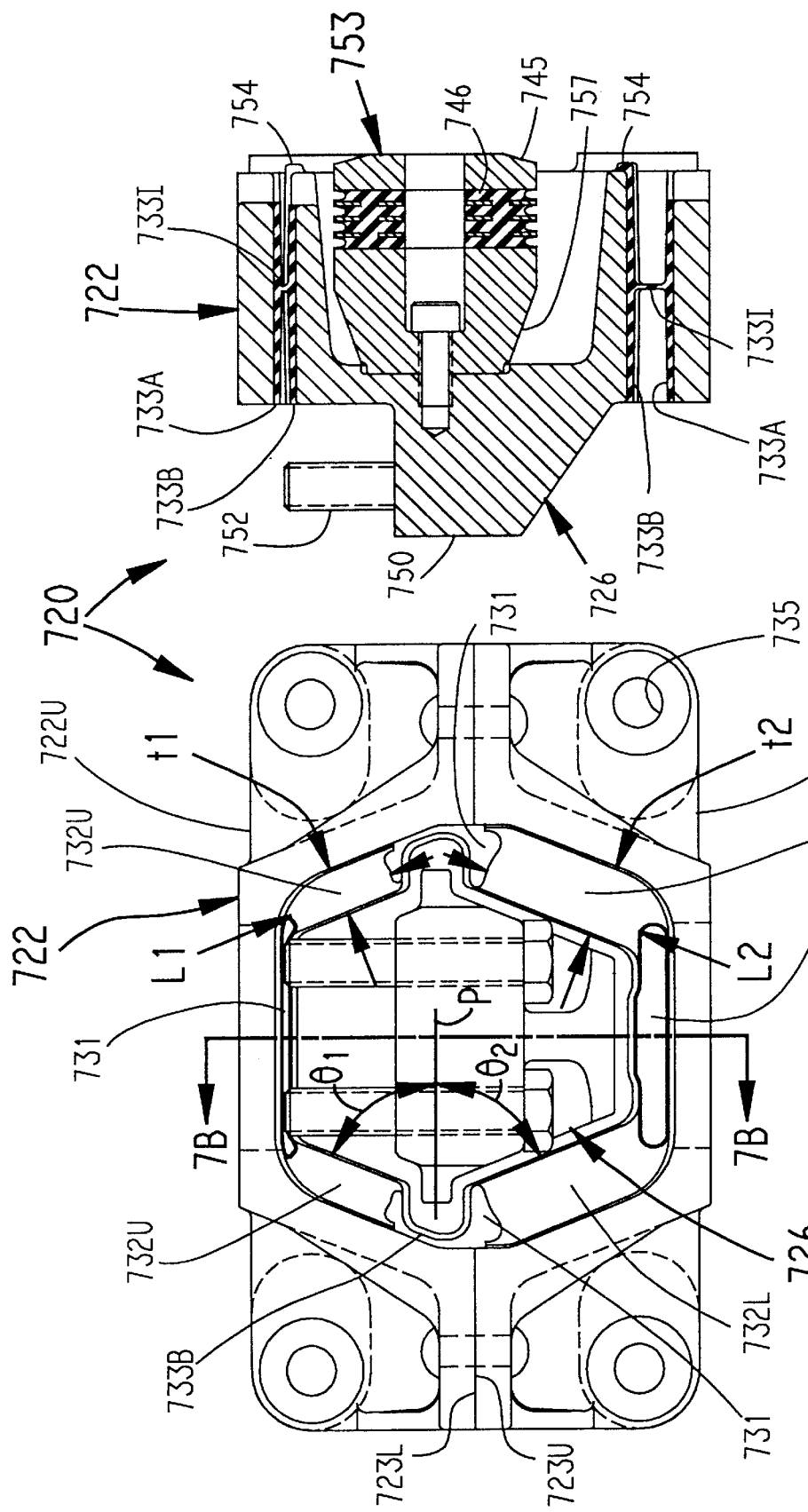

ISOLATING MOUNT WITH PRELOADED ELASTOMERIC COMPONENTS

BACKGROUND AND SUMMARY OF THE INVENTION

The present invention is directed to an elastomeric mount of the type used to support and isolate an engine from a vehicle chassis. More particularly the present invention is directed to a mount which has four preferably inclined elastomeric elements, each of which is simultaneously preloaded in compression and shear.

In applications involving off-highway equipment, elastomeric mounts must be rugged to take the pounding from traversing unimproved roads. In addition, these mounts should be designed to avoid total disconnect of the power train from the support in the event of elastomer failure (i.e., they are safetied). Finally, the provision of snubbing in all three orthogonal directions protects the power train, improves subjective ride quality and reduces unwanted chatter caused by metal-to-metal contact.

The mount of the present invention provides a safetied design that uses four preferably inclined elastomeric elements which are formed by spaced laterally extending compartments, and the elastomeric elements preferably being bonded to four outwardly facing faces of an inner member and to the four opposing inwardly facing faces of an outer member. Even should the elastomeric elements all fail, the inner member will be retained within the outer member. Either of the inner or outer member is bifurcated into separate elements and, in preassembled condition, the elements are spaced such that opposed mating surfaces of the upper and lower elements are non-engaging. In its final assembled position, the two mating surfaces are brought together, preferably into engaging contact resulting in each of the elastomeric components experiencing preloading in both the compressive and shear directions. This preload results in superior wear life of the elastomeric elements. Snubbing is preferably provided in each of the three orthogonal directions to eliminate metal-to-metal contact and resulting mechanical chatter.

In one embodiment, the opposing surfaces of the inner and outer members are designed to be non-planar in order to increase the stiffness of the mount in a lateral direction. In other embodiments, auxiliary lateral elements are used. This increase in spring rate raises the natural frequency of the mounting system out of an undesirable frequency range defined by the vehicle structure. In yet other embodiments, the bifurcated elements of the outer member interengage to maintain the mount in its assembled condition prior to installation.

Various other features, advantages and characteristics of the present invention will become apparent after a reading of the following specification.

BRIEF DESCRIPTION OF THE DRAWINGS

The accompanying drawings which form a part of the specification, illustrate several key embodiments of the present invention. The drawings and description together, serve to fully explain the invention. In the drawings.

FIG. 1C is a cross-sectional front view of the first embodiment of the mount shown in the pre-installed condition;

FIG. 1D is cross-sectional side view of one elastomeric component of the mount of the present invention as seen along line 1D—1D in FIG. 1C;

FIG. 2A is view of a second embodiment of mount;

FIG. 2B is a cross-sectional side view of the second embodiment as seen along line 2B—2B in FIG. 2A;

FIG. 3G is a cross-sectional side view of a lateral stiffness modification to the third embodiment of mount;

FIG. 3H is a cross-sectional side view of a second lateral stiffness modification to the third embodiment of the present invention;

FIG. 4B is a front view of a fifth embodiment of the mount of the present invention similar to the fourth embodiment;

FIG. 5A is a front view of a sixth embodiment of the mount;

FIG. 5B is a cross-sectioned side view of the sixth embodiment along a section line 5B—5B shown in FIG. 5A;

FIG. 5C is a front view of a sixth embodiment of the mount shown in a preassembled condition;

FIG. 6A is a front view of a seventh embodiment of the mount;

FIG. 6B is a top view of the seventh embodiment of the mount;

FIG. 6C is a side view of the seventh embodiment of the mount;

FIG. 7A is an front view of an eighth embodiment of the mount; and

FIG. 7B is a cross-sectional side view of an eighth embodiment of the mount along the section line 7B—7B shown in FIG. 7A.

DETAILED DESCRIPTION OF THE PREFERRED EMBODIMENTS

Figure 1B:
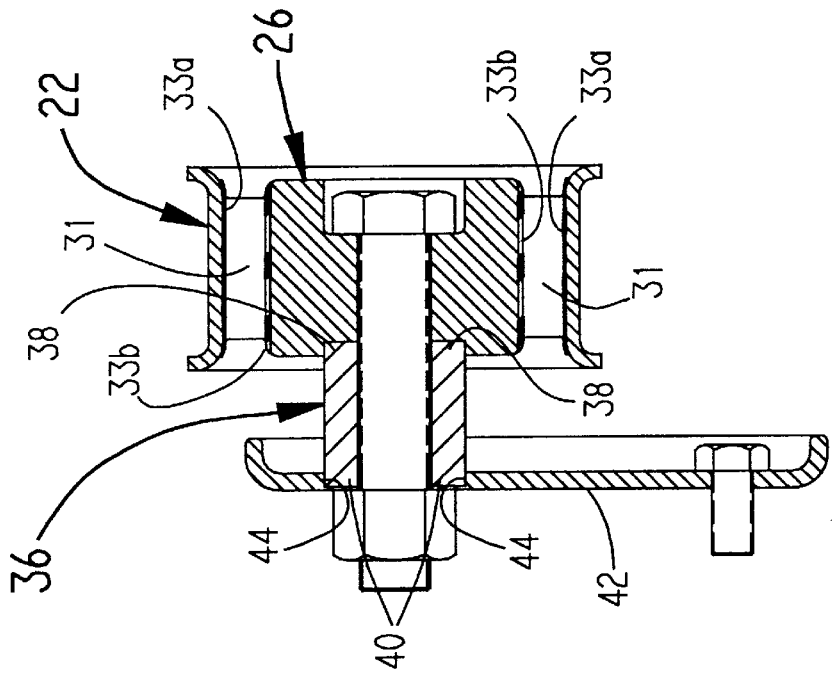
FIG. 1B is a cross-sectional side view of the first embodiment taken along line 1B—1B as seen in FIG. 1A.
Figure 1A:
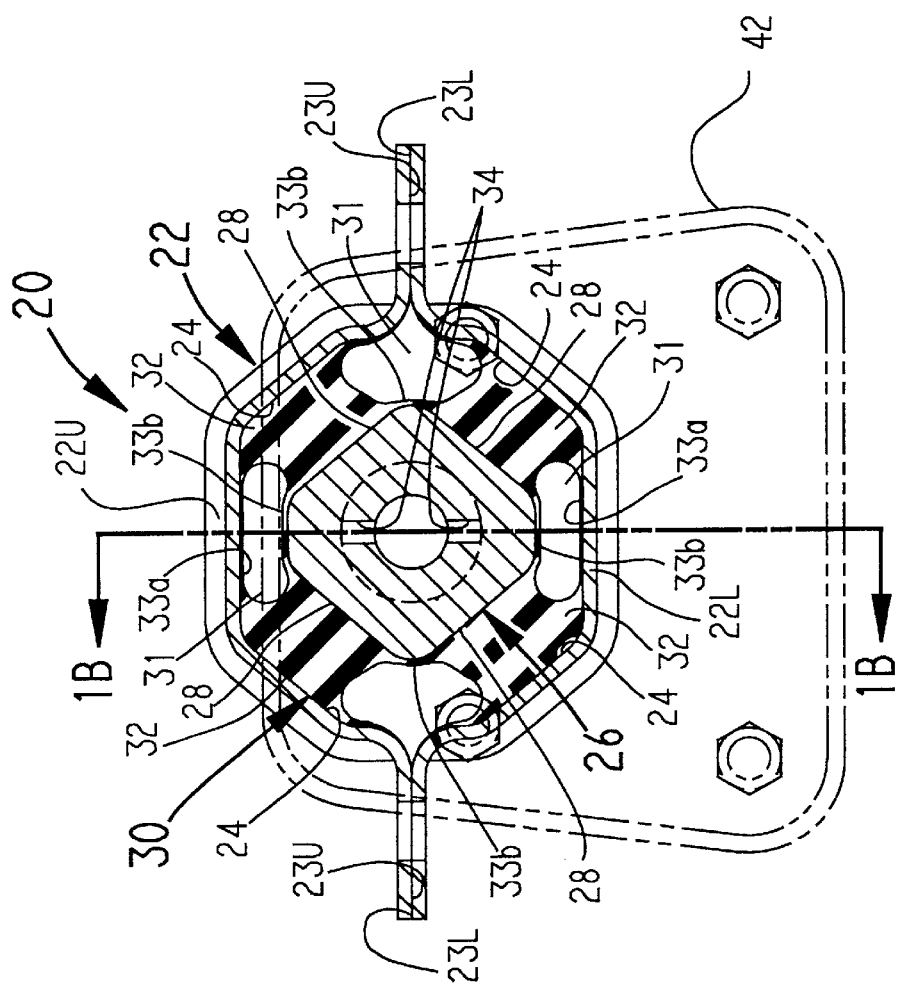
FIG. 1A is a cross-sectional front view of a first embodiment of the mount of the present invention.

A first embodiment of the mount of the present invention is depicted in FIGS. 1A–1D generally at 20. Mount 20 includes outer member 22, inner member 26 encircled by outer member and an elastomeric element 30. Inner member 26 has four outwardly facing inclined surfaces 28 which oppose four inwardly facing inclined surfaces 24. Elastomeric element 30 is comprised of four preferably interconnected components 32, one each of which is positioned between and, preferably bonded to, inclined surfaces 24 and 28. In this embodiment, outer member 22 is bifurcated into upper element 22U and lower element 22L which have first (23U) and second (23L) mating surfaces, respectively. Elastomeric components 32 are spaced apart and separated by laterally extending compartments 31 while preferably being interconnected by elastomeric webs 33a and 33b. Webs 33a and 33b offer corrosion inhibiting coating to all otherwise exposed metallic surfaces on the outer (22) and inner (26) members with the further advantage of preventing metal-to-metal contact.

As best seen in FIG. 1C, in its partially assembled condition, the thicknesses of the elastomeric components 32 are large enough such that the mating surfaces 23U and 23L are in non-engaging relationship. When bolts are inserted through apertures 25U, 25L formed in mating surfaces 23U, 23L, respectively, and those surfaces are drawn into contact, elastomeric components 32 are simultaneously preloaded in compression and shear to increase the durability of the elastomer (i.e., to extend its wear-life).

Now referring to FIGS. 1B and 1C, inner member 26 has a pair of notches 34 formed in one end which receive a pair of protrusions 38 extending from one end of an anti-rotation spacer 36. A like pair of protrusions 40 extending from the opposite end of spacer 36 are received in slot openings 44 in an adapter plate 42 which can be bolted to the engine or the support (not shown). The mating surfaces 23U and 23L are bolted to the other of said engine and said support. Typically, the inner member 26 will be attached to the engine and the outer member 22 to the support.

FIG. 1D is a cross-sectional view of the mount shown in FIG. 1C as seen along a section line 1D—1D. Since the static engine load (acting along a direction indicated by arrow A) creates increased compression strain on the lower elastomeric components 32L, those components will be more critical in providing the desired stiffness control of the mount than upper components 32U. Generally, a higher stiffness will be required in the lower elastomeric component 32L that the upper 32U to deter drift of the mount 20. Accordingly, it is an option to lessen the amount of elastomer in upper components 32U as depicted in FIG. 1D by making the width $d_1$ of components 32U unequal to (preferably less than) the width $d_2$ of lower components 32L.

Figure 2C:
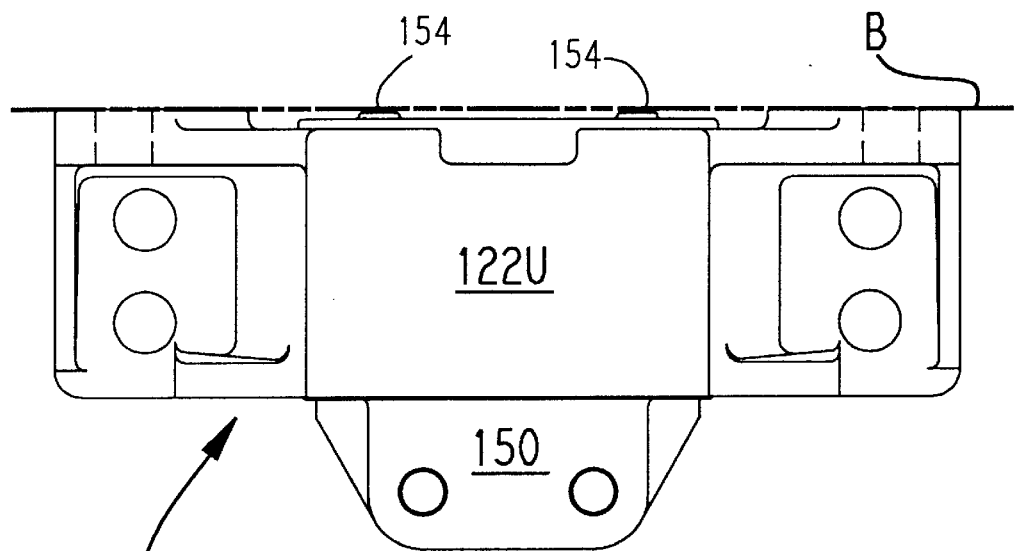
FIG. 2C is a top view of the second embodiment of mount.
Figure 2D:
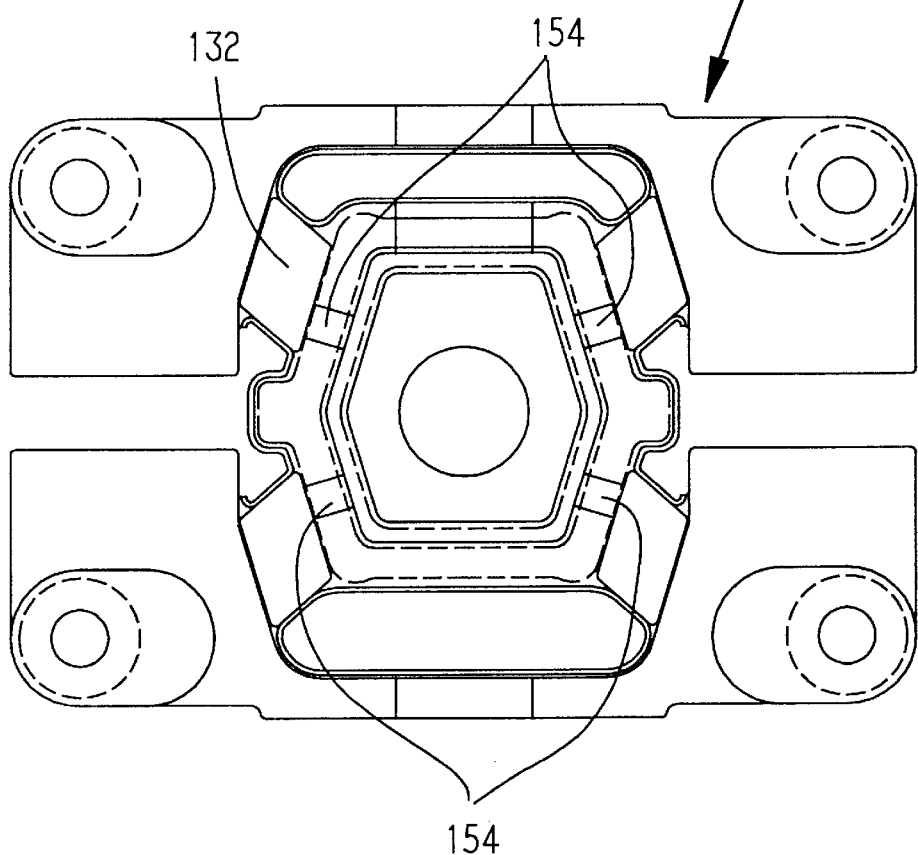
FIG. 2D is a back view of the second embodiment of the mount of the present invention, shown in pre-installed condition.

A second embodiment of the mount of the present invention is shown in FIGS. 2A–2D generally at 120. This second embodiment of the mount 120 is also a split (bifurcated) outer member design employing upper element 122U and lower element 122L. Holes 135 are used to bolt the outer member 122 to the support frame, commonly a truck chassis. The inner member 126 is best seen in FIG. 2B. Compartments 131 are formed by the use of cores in the mold and an intermediate web 133I interconnects outer web 133A and inner web 133B. A laterally extending shelf 150 offset from outer member 122 protrudes from the front side of inner member 126 and provides a means for securing mount 120 to the engine (not shown). A flange extends from the engine and apertures formed therein receive the bolts 152. The apertures in the flange may be threaded to receive bolts 152 or the apertures may be through bores and nuts may be used to effect attachment.

As in the case of the first embodiment, when the mating surfaces 123U, 123L are drawn together from their pre-assembled condition (shown in FIG. 2D) to their fully assembled position shown in FIG. 2A, elastomeric components 132 are simultaneously preloaded in compression and shear. Rivets shown urge the mating surfaces 123U, 123L into contact and maintain precompression of the mounting 120 when not installed. Movement of the inner member 126 relative to outer member 122 will be snubbed in all three orthogonal directions. Vertical movement is snubbed by compression of the intermediate web 133I and the engagement of outer web 133A with inner web 133B. Fore-and-aft movement will be snubbed by the engagement of the elastomeric web 133B encasing inner member 126 with the fore-and-aft inner surfaces of outer member 122. A plurality of elastomeric protrusions 154 (FIGS. 2C, 2D) are formed on the outward face (away from the engine and toward frame) of inner member 126 and will snub lateral motion against the support frame (whose position is indicated by dotted line B in FIGS. 2C and 2B). This three axis snubbing prevents mechanical chatter caused by engine vibration during operation and prevents overloading the elastomeric components 132. The variation discussed in connection with the first embodiment of varying the width of the upper elastomeric components 132 relative to the lower ones is applicable to this embodiment and those that follow, as well.

Figure 3A:
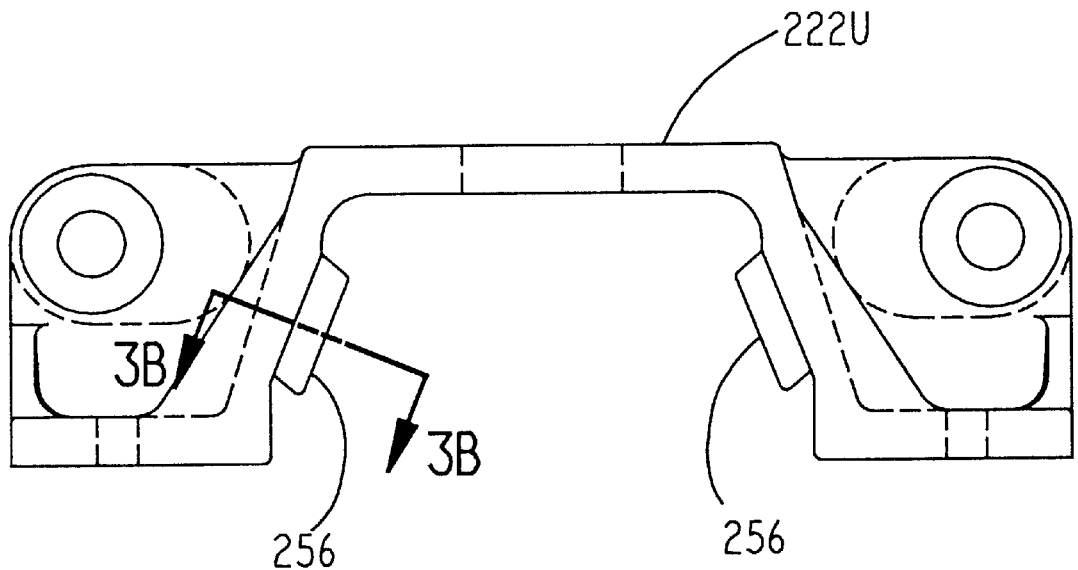
FIG. 3A is a front view of an upper portion of the bifurcated outer member of the mount of a third embodiment of the mount.
Figure 3B:
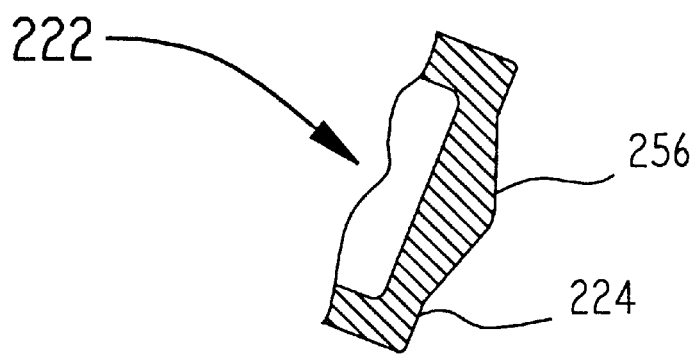
FIG. 3B is an enlarged cross-sectional side view of a portion of the outer member as seen along line 3B—3B in FIG. 3A.
Figure 3C:
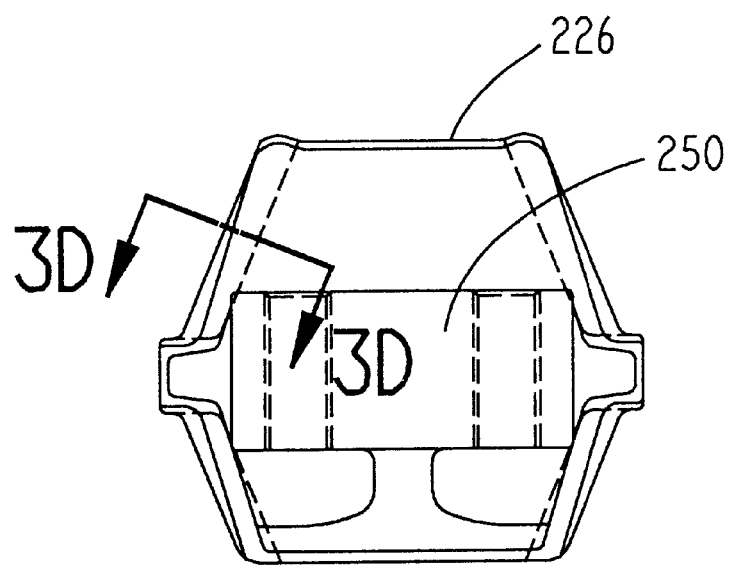
FIG. 3C is a front view of the inner member of the third embodiment of the mount.
Figure 3D:
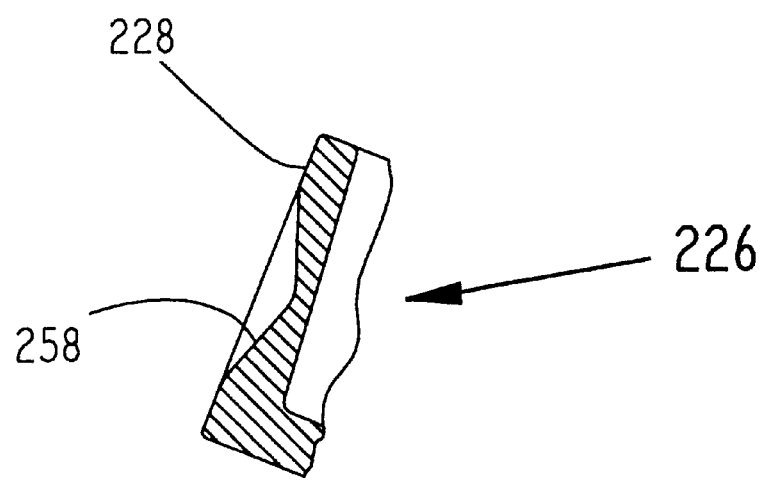
FIG. 3D is an enlarged cross-sectional side view of a portion of the inner member as seen along line 3D—3D of FIG. 3C.
Figure 3E:
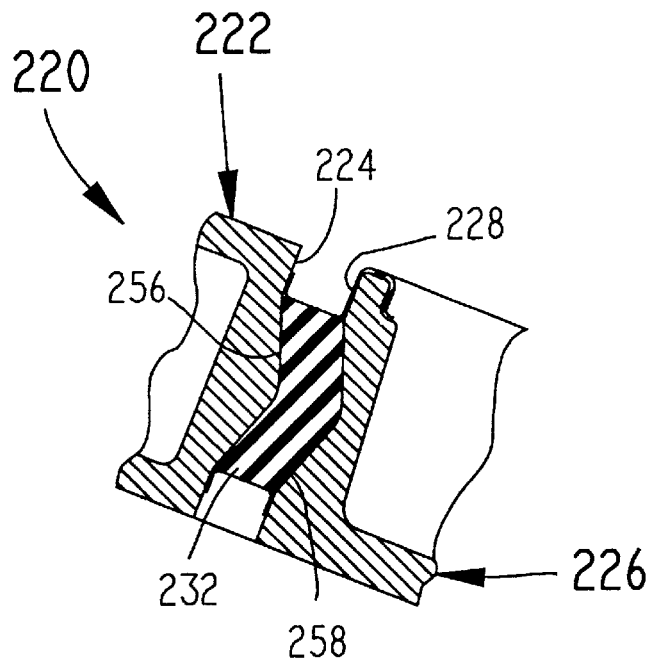
FIG. 3E is an enlarged cross-sectional side view of the third embodiment of the mount showing the nonplanar opposing pairs of surfaces.

Portions of a third embodiment of the present invention are shown in FIGS. 3A–3E generally at 220. For some applications, it is desired to increase the lateral shear stiffness of the mount 220. This embodiment affords the desired increase in stiffness by providing the opposing surfaces 224, 228 on the outer (222) and inner (226) members with a non-planar configuration. As best seen in FIG. 3E, the configuration depicted is a laterally oriented V-shaped although other non-planar configurations, such as arcuate, might also be used. The elastomeric element 232 is deformed into a V shape by protrusion 256 and valley 258. These non-planar surfaces 224 and 228 will be formed on both upper element 222U (FIG. 3A) and lower element (not shown) and on inner (226) member. The shear stiffness of elastomeric elements 232 will be increased in the lateral direction transverse to the V.

Figure 3F:
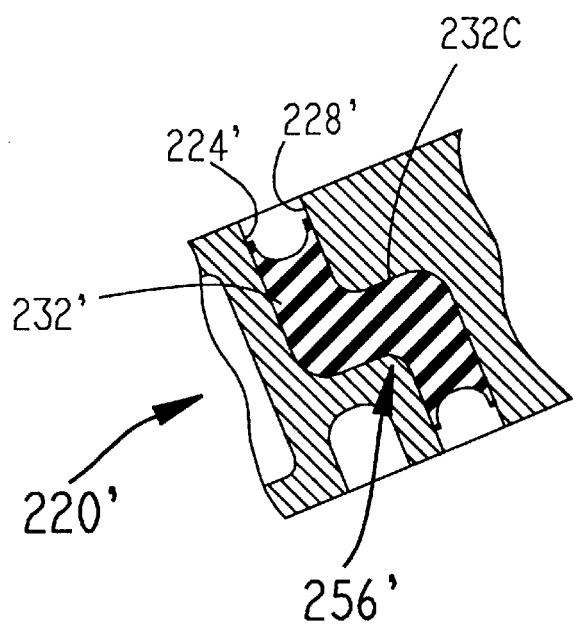
FIG. 3F is a cross-sectional side view of a third nonplanar modification to the third embodiment of the mount.

Another modification to the third embodiment is shown in FIG. 3F generally at 220'. Should the use of a chevron or V-shape to the elastomer be insufficient to produce a large enough increase in the stiffness in the lateral shear direction, an S-shaped protrusion 256' can be employed between outer surface 224' and inner surface 228'. This essentially inserts a compressive section 232C in the lateral direction and enables a larger incremental increase in the stiffness to be added without increasing the stiffness of the elastomer in elastomeric element 232'.

Second and third modifications to the third embodiment are shown in FIGS. 3G and 3H, respectively. In the mount 220" shown in FIG. 3G, lateral stiffness is added to the mount 220" by the addition of a separate laterally extending element 253". The laterally extending element 253" includes an elastomer element 246" bonded to a plate 245" which has means for interconnecting to the chassis 11". For example, a threaded bore 248" in plate 245" receiving a fastener (not shown) inserted through opening 13" in chassis 11". Optionally, as is shown in FIG. 3H, a protruding boss 248'" formed on plate 245'" that engages in an opening 13'" in chassis 11'" may be used. Notably, use of a fastening bolt is rendered unnecessary by providing an axial preload on the laterally extending element 253'" thereby precompressing lateral elastomeric element 246'" when mount 220'" is bolted to chassis 11'". This preload will provide additional stiffness to the mount in this lateral direction, enabling the mount 220'" to meet the required stiffness criteria. In the two modifications depicted in FIGS. 3G and 3H, lateral stiffness can be added without having to affect the stiffness of the elastomer used in the precompressed elastomeric elements. As before, shelf 250 including bolts 252 attaches to the engine.

Figure 4A:
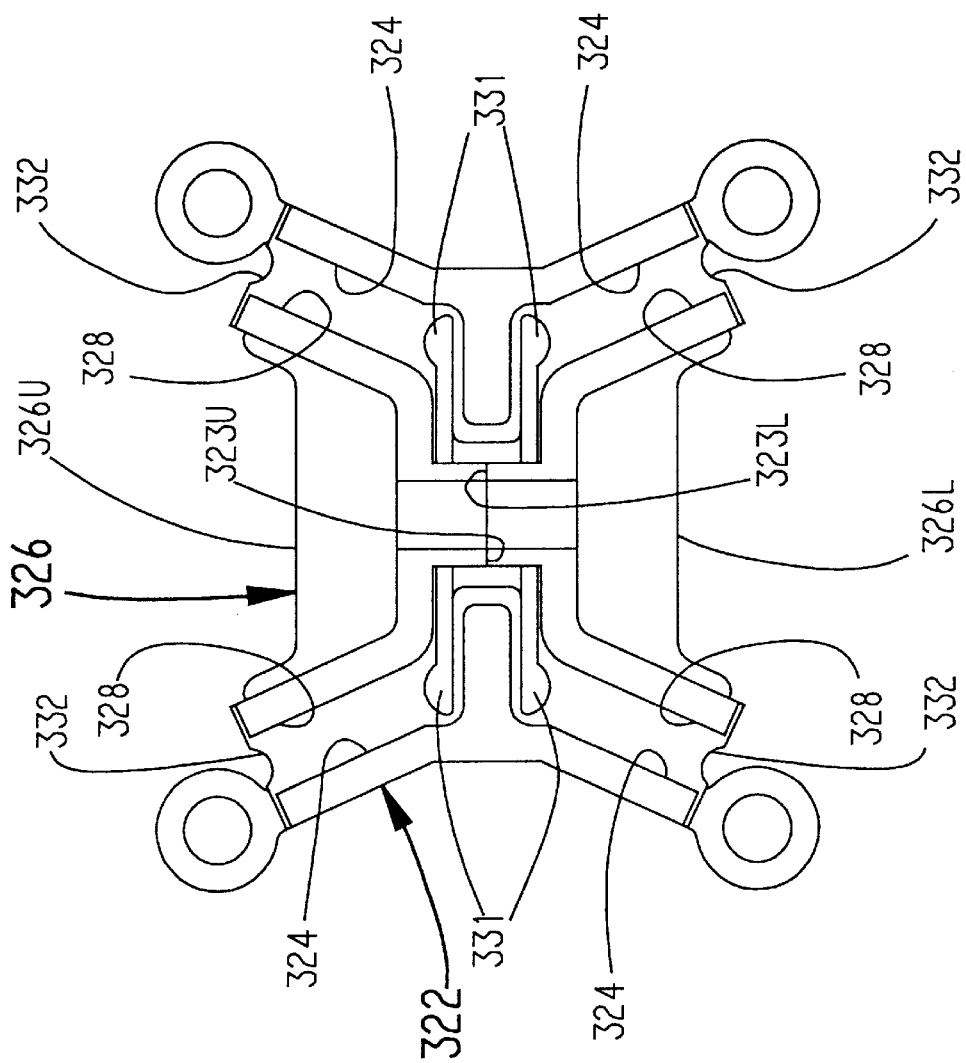
FIG. 4A is a front view of a fourth embodiment of the mount with a bifurcated inner member.

A fourth embodiment is depicted in FIG. 4A. In this embodiment, the outer member 322 is one piece and inner member 326 is split (bifurcated). Mating surfaces 323U and 323L are formed on upper element 326U and lower element 326L, of inner member 326 respectively. The outer member 322 no longer surrounds the inner member 326, as was the case in the previous embodiments. Rather, the reacting faces 324 of the outer member 322 are seemingly reversed, such that the surfaces 324 of the outer member are divergent and the actual halves of the inner member no longer form a closed perimeter either but have outwardly directed arms in which surfaces 328 are generally parallel to inwardly directed surfaces 324. The elastomeric components 332 then, too, are reversed so as not to form a closed polygon. Four laterally extending compartments 331 afford some room for movement of the inner member 326 relative to the outer member 322 before snubbing occurs. In this embodiment, it is the drawing of the mating surfaces 323U and 323L on the inner member 326 into contact that results in the preloading in the compressive and shear directions in the elastomeric elements 332. Snubbing is provided in all three orthogonal directions.

A fifth embodiment of mount 420 is shown in FIG. 4B. This embodiment, also has a split inner member 426 shown here in its pre-assembled position with elastomeric components 432 in an unloaded condition. In this embodiment, the mating surfaces 423U, 423L on upper (426U) and lower (426L) elements extend the full length of the bottoms of trough-shaped inner components 426U, 426L. When drawing down takes place during engine installation by inserting bolts or the like, into holes 425U, 425L, compartment 431 will be eliminated forming two smaller residual compartments at the ends of mating surfaces 423U, 423L. In these last two embodiments, an engine bracket is secured to the mount 320, 420 via bolts through the inner member holes 425U, 425L. The four holes shown through the outer members 322, 422 attach mounts 320, 420 to the frame.

A sixth embodiment is depicted in FIGS. 5A and 5B generally at 520. Outer surfaces 524 of inner member 526 are partially radiused as are the corners of the inner surfaces 528 of outer member 522. The outer member 522 is shown in its preassembly configuration in FIG. 5c. Outer member 522 is bifurcated into right sleeve portions 522R and left sleeve portions 522L which are precompressed together, thereby precompressing elastomer components 532U, 532L simultaneously in compression and shear. Once precompressed, the sleeves 522L, 522R are slid into, and received within, a pocket 529 formed in retaining plate 527. A projecting portion 537, which has pocket 529 formed therein, is welded to lip portion 535 of base plate 541 to form retaining plate 527. The right and left sleeve portions 522R, 522L are retained laterally within pocket 529 in retaining plate 527 by staking the edge of the projecting portion 537 at its terminal end 539. As with earlier embodiments, a shelf 550 provides a surface for attaching the engine. In this embodiment, the outer member 522 comprises retaining plate 527 and right and left sleeve portions 522R, 522L. Vertical snubbing in accomplished by inner web 533A contacting outer web 533B on portions of sleeves 522R, 522L. Lateral snubbing is dictated by elastomer protrusions 554 formed on the frame side of inner member 526. Fore-and-aft snubbing occurs when inner member 526 contacts fore-and-aft surfaces of sleeves 522R, 522L.

A seventh embodiment of the present invention is shown in FIGS. 6A–6C generally at 620. The basic configuration is similar to that of the second embodiment with inclined elastomeric components 632 being compressed between generally parallel surfaces 624, 628. As with the sixth embodiment, this design includes means to hold the mount 620 in its fully assembled condition without using fasteners. In this embodiment, a pair of fold-over tangs 660 are employed to retain engagement of the overlapping mating surfaces 23U, 623L. Upper element 622U is identical to lower element 622L (except for the tangs 660 being trimmed from the lower element) and hence, the tooling costs for producing these identical metal stampings can be greatly reduced. Inner member 626 will move downwardly under the engine load to a more centered position for better snubbing performance. An additional benefit of this embodiment is that the flanges 621U, 621L are continuous around the part enhancing the overall strength of the metallic elements of the mount 620. The metal used is preferably aluminum to reduce the weight of the mount.

An eighth embodiment of the mount of the present invention is shown in FIGS. 7a and 7b generally at 720. This embodiment of the mount 720 is also a split (bifurcated) outer member design as is the FIG. 2a and 2b embodiment employing upper element 722U and lower element 722L. Holes such as 735 are used to bolt the outer member 722 to the support frame, commonly a truck chassis. The inner member 726 is best seen in FIG. 7B. Compartments 731 are formed by the use of cores in the mold and an intermediate web 733I interconnects outer web 733A and inner web 733B. A shelf 750 protrudes from the front side of inner member 726 and provides a means for securing mount 720 to the engine (not shown). A flange extends from the rear of the engine and apertures therein receive bolts 752. The apertures in the flange may be attached as heretofore mentioned.

As was the case of the FIGS. 2a and 2b embodiment, when the mating surfaces 723U, 723L are drawn together from their pre-assembly position to their full assembled position shown in FIG. 7A, upper and lower elastomeric components 732U, 732L are preloaded in both compression and shear. Preferably, in another aspect of the present invention, movement of the inner member 726 relative to outer member 722 will be snubbed in all three orthogonal directions. Vertical movement is snubbed by means of compression of the intermediate web 733I and the engagement of web 733A with we 733B. Fore-and-aft movement may be snubbed by means of the engagement of the elastomeric web 733B encasing inner member 726 with the fore-and-it inner surfaces of the outer member 722. Elastomeric protrusions 154 (FIG. 7D) formed on the outward face of inner member 726 will snub lateral motion against the support frame (not shown). This three axis snubbing prevents mechanical chatter during operation and prevents elastomer overloading.

The first variation discussed in connection with the first embodiment embodies varying the width of the upper elastomeric components 732U relative to the lower ones 732L. In another variation, the thickness t1 of the upper elastomer sections 732U may differ (being preferably thinner) as compared to the thickness t2 of the lower section 732L. Third, the length L1 of the upper sections 732U may be different (preferably longer) than the length L2 of the lower section 732L. Notably, it is preferable that the incline angle of the upper and lower sections 732U, 732L from a horizontal plane intersecting the mount 720 (designated by line P) be the same, for example, an upper incline angle $\Theta1$ is exactly equal to lower incline angle $\Theta2$. In order to achieve the appropriate high fore-and-aft and lower vertical rates, it is preferable that the angle be greater than about 45 degrees. In particular, in a best mode, it is desired to achieve a 3 to 1 ratio of fore-and-aft spring rate to vertical spring rate. This is achieved by using about a 68 degree angle $\Theta 1$, $\Theta 2$. Notably, in the FIGS. 4a and 4b concepts having a bifurcated inner member, the upper elastomer components are preferably longer, wider, and thicker than the lower sections, as they predominantly carry the loads.

Preferably, one or more of these above-mentioned three features are incorporated and result in a spring rate of the lower section 732L which is greater than that of the upper section 732U. Preferably, the stiffness of the lower elastomer 732L in the vertical direction is two or more times stiffer, and more preferably about a factor of four stiffer, than the upper section 732U.

A removable lateral portion 753 is detachable from the inner member 722 and includes a laminated elastomer and shim lateral section 746 which provides additional lateral stiffness. In this embodiment, the lateral portion is removable for ease of tuning and substitution for different applications. The elastomer section 746 is bonded to the base portion 757 and the plate 745. Preferably, the lateral stiffness element increases the vertical stiffness to lateral stiffness ratio to about 1 to 4 or greater.

Various changes, alternatives and modifications to invention will become apparent to one of ordinary skill in the art after a reading of the foregoing specification. It is intended that all such changes, alternatives and modifications as come within the scope of the appended claims be considered part of the present invention.

What is claimed is:

1. A mount, comprising
  a) an outer member having at least four inwardly facing surfaces;
  b) an inner member having at least four outwardly facing surfaces each of which opposes one of said four inwardly facing surfaces of said outer member forming therewith opposing pairs of surfaces;
  c) an elastomeric element positioned between said inner and outer members, said elastomer element having a plurality of elastomer components, one each of said elastomer components being positioned between each of said opposing pairs of surfaces and separated by laterally extending compartments, each said elastomer component having a length, a width, and a thickness;
  d) one of said outer and inner members being bifurcated into a pair of elements, a first element and a second element, said first element having a first mating surface portion and said second element having a second mating surface portion, the thickness of each of said elastomer components being such that, in a partially assembled condition, said first and second mating surfaces are in a relative non-engaging relationship;
  whereby when said mount is fully assembled, said first mating surface of said first element is drawn into engagement with said second mating surface of said second element precompressing each of said elastomer components.

2. The mount of claim 1 wherein the opposed pairs of surfaces are angled at an angle ($\Theta$) relative to a horizontal such that each of said elastomer components is further preloaded in shear when said first and second mating surfaces are drawn together.

3. The mount of claim 1 wherein said angle ($\Theta$) is greater that 45 degrees.

4. The mount of claim 1 wherein said angle ($\Theta$) is about 68 degrees such that a fore-and aft to vertical stiffness ratio of about 3 to 1 is achieved.

5. The mount of claim 1 wherein said bifurcated member comprises said outer member which includes laterally extending flanges that form said first and second mating surfaces.

6. The mount of claim 1 wherein at least one of each of said opposing pairs of surfaces is non-planar in configuration.

7. The mount of claim 1 wherein said bifurcated member comprises said inner member which includes laterally extending central surface portions which form said first and second mating surfaces.

8. The mount of claim 1 wherein each said elastomer component is bonded to its respective outwardly directed surface of said inner member.

9. The mount of claim 8 wherein each said elastomer component is bonded to its respective opposing inwardly directed surface on said outer member.

10. The mount of claim 1 wherein said bifurcated member comprises the outer member including said first and second elements which have overlapping portions and means for interengaging said first and second elements such that said first and second mating surface portion can be retained in a fully assembled condition prior to installation.

11. The mount of claim 10 wherein said means for interengaging comprises at least one tang on a first one of said first and second elements which is folded over a portion of another of said first and second elements.

12. The mount of claim 1 wherein said width of some of said elastomer components is greater than said width of others of said elastomer components.

13. The mount of claim 1 wherein said thickness of some of said elastomer components is greater than said thickness of others of said elastomer components.

14. The mount of claim 1 wherein said length of some of said elastomer components is greater than said length of others of said elastomer components.

15. The mount of claim 1 wherein at least two of said length, said width, and said thickness of some of said elastomer components is different than a corresponding dimension of others of said elastomer components.

16. The mount of claim 1 wherein said elastomer components further comprise upper elastomer components and lower elastomer components, wherein said lower components have a stiffness at least twice the stiffness of said upper component.

17. The mount of claim 1 further including a lateral stiffness adding section laterally protruding from said inner member.

18. The mount of claim 17 wherein said lateral stiffness adding section is detachable.

19. The mount of claim 17 wherein said lateral stiffness adding section include laminated elastomer and shim construction.

20. The mount of claim 17 wherein said lateral stiffness adding section includes an elastomer section bonded to a plate.

21. The mount of claim 1 further comprising means for snubbing in three orthogonal directions to limit displacement of said elastomer components.

22. A mount, comprising
  a) an outer member having four inclined inwardly facing surfaces;
  b) an inner member having four inclined outwardly facing surfaces each of which opposes one of said four inclined inwardly facing surfaces of said outer member forming therewith four opposing pairs of surfaces;
  c) an elastomer element positioned between said inner and outer members, said elastomer element having four elastomer components, one each of said elastomer components being positioned between each of said four opposing pairs of surfaces and being separated by laterally extending compartments, each said elastomer component having a length, a width, and a thickness;

d) one of said outer and inner members being bifurcated into a first element and a second element, said first element having a first mating surface portion and said second element having a second mating surface portion, the thickness of each of said four elastomer components being such that, in a partially assembled condition, said first and second mating surfaces are in a relative non-engaging relationship and when said mount is fully assembled, said first mating surface of said first element is drawn into engagement with said second mating surface of said second element precompressing each of said four elastomer components; and e) means for snubbing in three orthogonal directions to limit displacement of said four elastomer components.

23. A mount, comprising a) an outer member having four inclined inwardly facing surfaces;

b) an inner member having four inclined outwardly facing surfaces each of which opposes one of said four inclined inwardly facing surfaces of said outer member forming therewith four opposing pairs of surfaces;

c) an elastomer element positioned between said inner and outer members, said elastomer element having two upper and two lower elastomer components, said upper elastomer components being positioned between two of said four opposing pairs of surfaces and said lower elastomer components being positioned between another two of said four opposing pairs of surfaces and each elastomer component being separated by laterally extending compartments, each said elastomer component having a length, a width, and a thickness, and at least two of said length, width, and thickness of said lower elastomer components being of a different dimension than a corresponding two dimensions of said upper elastomer components; and d) one of said outer and inner members being bifurcated into first and second elements, the thickness of each of said four elastomer components being such that, in a partially assembled condition, that said four elastomer components are uncompressed, and when said mount is fully assembled, said first element is drawn toward said second element precompressing each of said four elastomer components, and e) means for interengaging said first and second elements such that said first and second elements are retained in a fully assembled condition prior to installation.

24. A mount for supporting and isolating a first member from a second member, comprising:

first means adapted to be connected to the first member, said first means including a first pair of inclined inwardly facing surfaces diverging from each other on opposite sides of a first plane and said surface extending from respective ones of spaced apart central locations in a first direction from a second plane passing through the central locations and normal to the first plane, and a second pair of inclined inwardly facing surfaces diverging from each other on opposite sides of the first plane and extending from respective ones of said spaced apart locations in a second direction opposite from said first direction from the second plane;

second means adapted to be connected to the second member, said second means including outwardly facing surfaces in parallel spaced relation to respective ones of said inwardly facing surfaces and forming four opposed pairs of surfaces;

elastic means contiguously connected in compression between each of said opposed pairs of surfaces; and stiffness adding means protruding laterally from said second means for limiting a lateral deflection of said elastic means.

* * * * *